United States Patent
Chang et al.

(10) Patent No.: US 10,688,527 B2
(45) Date of Patent: Jun. 23, 2020

(54) PHOSPHOR DEVICE COMPRISING PLURAL PHOSPHOR AGENTS FOR CONVERTING WAVEBAND LIGHT INTO PLURAL COLOR LIGHTS WITH DIFFERENT WAVELENGTH PEAKS

(71) Applicant: DELTA ELECTRONICS, INC., Taoyuan (TW)

(72) Inventors: Keh-Su Chang, Taoyuan (TW); Jih-Chi Li, Taoyuan (TW); Li-Cheng Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/391,158

(22) Filed: Apr. 22, 2019

(65) Prior Publication Data

US 2019/0270116 A1    Sep. 5, 2019

Related U.S. Application Data

(63) Continuation-in-part of application No. 15/403,995, filed on Jan. 11, 2017, now Pat. No. 10,310,363,
(Continued)

(30) Foreign Application Priority Data

Mar. 25, 2019    (CN) .......................... 2019 1 0227727

(51) Int. Cl.
*F21V 9/08* (2018.01)
*B05D 5/06* (2006.01)
(Continued)

(52) U.S. Cl.
CPC .................. *B05D 5/06* (2013.01); *F21V 9/08* (2013.01); *F21V 9/30* (2018.02); *F21V 9/38* (2018.02);
(Continued)

(58) Field of Classification Search
CPC ... B05D 5/06; F21V 13/08; F21V 9/08; F21V 9/30; G03B 21/204; H04N 9/3105; H04N 9/3114; H04N 9/3158
(Continued)

(56) References Cited

U.S. PATENT DOCUMENTS 3,999,062 A    12/1976  Demsky et al.
5,967,636 A *  10/1999  Stark ..................... H04N 9/3129
                                                              348/743
(Continued)

FOREIGN PATENT DOCUMENTS

CN    1536376 A    10/2004
CN    1547266 A    11/2004
(Continued)

*Primary Examiner* — Que Tan Le
(74) *Attorney, Agent, or Firm* — Kirton & McConkie; Evan R. Witt

(57) ABSTRACT

A phosphor device of an illumination system emitting a first waveband light includes a substrate and a phosphor layer formed on the substrate. The phosphor layer includes a first phosphor agent and a second phosphor agent. The first waveband light is converted into a first color light by the first phosphor agent. The second phosphor agent is distributed over the first phosphor agent and mixed with the first phosphor agent, and the first waveband light is converted into a second color light by the second phosphor agent. The first color light and the second color light are integrated into the second waveband light. The difference between the first wavelength peak of the first color light and the second wavelength peak of the second color light is 50 to 100 nanometers. Therefore, the advantages of increasing the purity, the luminance and the luminous intensity of specific color light are achieved.

24 Claims, 14 Drawing Sheets

Related U.S. Application Data which is a continuation-in-part of application No. 14/979,128, filed on Dec. 22, 2015, now Pat. No. 9,726,335, which is a continuation-in-part of application No. 14/478,579, filed on Sep. 5, 2014, now Pat. No. 9,274,407, which is a continuation of application No. 13/617,201, filed on Sep. 14, 2012, now Pat. No. 9,024,241.

(60) Provisional application No. 61/537,687, filed on Sep. 22, 2011, provisional application No. 62/770,401, filed on Nov. 21, 2018.

(51) Int. Cl.
| | |
|---|---|
| *F21V 13/08* | (2006.01) |
| *H04N 9/31* | (2006.01) |
| *G03B 21/20* | (2006.01) |
| *F21V 9/30* | (2018.01) |
| *F21V 9/38* | (2018.01) |

(52) U.S. Cl.
CPC ............ *F21V 13/08* (2013.01); *G03B 21/204* (2013.01); *H04N 9/3105* (2013.01); *H04N 9/3114* (2013.01); *H04N 9/3158* (2013.01); *H04N 9/3164* (2013.01); *B32B 2307/422* (2013.01)

(58) Field of Classification Search
USPC ........................................ 250/226, 216, 239
See application file for complete search history.

(56) References Cited

U.S. PATENT DOCUMENTS

| | | | |
|---|---|---|---|
| 5,998,925 | A | 12/1999 | Shimizu et al. |
| 6,294,800 | B1 | 9/2001 | Duggal et al. |
| 6,467,910 | B1 | 10/2002 | Sato |
| 6,685,852 | B2 | 2/2004 | Setlur et al. |
| 6,884,671 | B2 | 4/2005 | Jenq |
| 7,547,114 | B2 | 6/2009 | Li et al. |
| 7,654,681 | B2 | 2/2010 | Kim et al. |
| 7,737,621 | B2 | 6/2010 | Masuda et al. |
| 7,863,635 | B2 | 1/2011 | Andrews et al. |
| 7,906,892 | B2 | 3/2011 | Choi et al. |
| 8,173,974 | B2 | 5/2012 | Zheng et al. |
| 8,556,437 | B2 | 10/2013 | Miyake |
| 8,558,448 | B2 | 10/2013 | Harada |
| 8,562,141 | B2 | 10/2013 | Ogino |
| 8,662,678 | B2 | 3/2014 | Hirata et al. |
| 8,733,940 | B2 | 5/2014 | Tanaka et al. |
| 9,175,830 | B2 | 11/2015 | Yang et al. |
| 2005/0184298 | A1 | 8/2005 | Ueda |
| 2005/0206301 | A1 | 9/2005 | Ng |
| 2005/0270775 | A1 | 12/2005 | Harbers et al. |
| 2006/0226759 | A1 | 10/2006 | Masuda et al. |
| 2008/0211386 | A1 | 9/2008 | Choi et al. |
| 2009/0034284 | A1 | 2/2009 | Li et al. |
| 2009/0039375 | A1 | 2/2009 | LeToquin et al. |
| 2009/0051884 | A1 | 2/2009 | Kuan et al. |
| 2009/0224177 | A1 | 9/2009 | Kinomoto et al. |
| 2010/0213821 | A1 | 8/2010 | Masuda et al. |
| 2010/0220298 | A1 | 9/2010 | Wang et al. |
| 2010/0264448 | A1 | 10/2010 | Choi et al. |
| 2010/0314650 | A1 | 12/2010 | Sugimori |
| 2010/0315320 | A1 | 12/2010 | Yoshida |
| 2010/0328626 | A1 | 12/2010 | Miyazaki |
| 2011/0018026 | A1 | 1/2011 | Konno et al. |
| 2011/0043761 | A1 | 2/2011 | Miyamae |
| 2011/0051095 | A1 | 3/2011 | Narimatsu et al. |
| 2011/0057118 | A1 | 3/2011 | Zheng et al. |
| 2011/0063581 | A1 | 3/2011 | Iwanaga |
| 2011/0089456 | A1 | 4/2011 | Andrews et al. |
| 2011/0096300 | A1 | 4/2011 | Shibasaki |
| 2011/0149549 | A1 | 6/2011 | Miyake |
| 2011/0156071 | A1 | 6/2011 | Cheng et al. |
| 2011/0188010 | A1 | 8/2011 | Lin et al. |
| 2011/0199580 | A1 | 8/2011 | Hirata et al. |
| 2011/0205502 | A1 | 8/2011 | Kato et al. |
| 2011/0211333 | A1 | 9/2011 | Bartlett |
| 2011/0227477 | A1 | 9/2011 | Zhang et al. |
| 2011/0228232 | A1 | 9/2011 | Sakata et al. |
| 2011/0228514 | A1 | 9/2011 | Tong et al. |
| 2011/0248296 | A1 | 10/2011 | Choi et al. |
| 2011/0261326 | A1 | 10/2011 | Wang et al. |
| 2011/0310353 | A1 | 12/2011 | Maeda |
| 2011/0310362 | A1 | 12/2011 | Komatsu |
| 2012/0039065 | A1 | 2/2012 | Sun et al. |
| 2012/0062857 | A1 | 3/2012 | Saitou et al. |
| 2012/0267998 | A1 | 10/2012 | Sohn et al. |
| 2013/0050654 | A1 | 2/2013 | Hu et al. |
| 2013/0113365 | A1 | 5/2013 | Yamasuge et al. |
| 2013/0228812 | A1 | 9/2013 | Annen et al. |
| 2013/0234591 | A1 | 9/2013 | Hattori et al. |
| 2013/0307011 | A1 | 11/2013 | Yamakawa et al. |
| 2014/0146293 | A1 | 5/2014 | Hirata et al. |
| 2014/0334181 | A1 | 11/2014 | Hu et al. |
| 2015/0098070 | A1 | 4/2015 | Hsieh et al. |
| 2015/0184066 | A1 | 7/2015 | Kwon et al. |

FOREIGN PATENT DOCUMENTS

| | | |
|---|---|---|
| CN | 1837893 A | 9/2006 |
| CN | 1929155 A | 3/2007 |
| CN | 101212015 A | 7/2008 |
| CN | 101354481 A | 1/2009 |
| CN | 100517781 C | 7/2009 |
| CN | 100533795 C | 8/2009 |
| CN | 101562227 A | 10/2009 |
| CN | 101650311 A | 2/2010 |
| CN | 101937162 A | 1/2011 |
| CN | 101937164 A | 1/2011 |
| CN | 201717287 U | 1/2011 |
| CN | 101995748 A | 3/2011 |
| CN | 102073115 A | 5/2011 |
| CN | 102155639 A | 8/2011 |
| CN | 102156639 A | 8/2011 |
| CN | 202109406 U | 1/2012 |
| CN | 102650811 A | 8/2012 |
| CN | 103018864 A | 4/2013 |
| CN | 104101975 A | 10/2014 |
| CN | 104379987 A | 2/2015 |
| CN | 104676491 A | 6/2015 |
| EP | 2271120 A1 | 1/2011 |
| EP | 2339655 A2 | 6/2011 |
| EP | 2355524 A1 | 8/2011 |
| EP | 2360523 A1 | 8/2011 |
| EP | 2362452 A2 | 8/2011 |
| EP | 2749943 A1 | 7/2014 |
| JP | 2003295319 A | 10/2003 |
| JP | 2004325874 A | 11/2004 |
| JP | 2007156270 A | 6/2007 |
| JP | 2008124504 A | 5/2008 |
| JP | 2009245712 A | 10/2009 |
| JP | 2009277516 A | 11/2009 |
| JP | 2010515096 A | 5/2010 |
| JP | 2011048139 A | 3/2011 |
| JP | 2011071404 A | 4/2011 |
| JP | 2011100163 A | 5/2011 |
| JP | 2011128522 A | 6/2011 |
| JP | 2011165555 A | 8/2011 |
| JP | 2011168627 A | 9/2011 |
| JP | 2011175000 A | 9/2011 |
| JP | 2011197212 A | 10/2011 |
| JP | 2012137744 A | 7/2012 |
| JP | 2012203366 A | 10/2012 |
| JP | 5459537 B2 | 4/2014 |
| JP | 2016081054 A | 5/2016 |
| JP | 2017027685 A | 2/2017 |
| JP | 2017117773 A | 6/2017 |
| TW | 200912475 A | 3/2009 |
| TW | 201000617 A | 1/2010 |
| TW | 201251136 A | 12/2012 |
| TW | 201418414 A | 5/2014 |

(56) References Cited

FOREIGN PATENT DOCUMENTS

| TW | I448806 B | 8/2014 |
|---|---|---|
| WO | WO2009/017992 A1 | 2/2009 |
| WO | 2012135744 A2 | 10/2012 |
| WO | 2013029463 A1 | 3/2013 |

\* cited by examiner

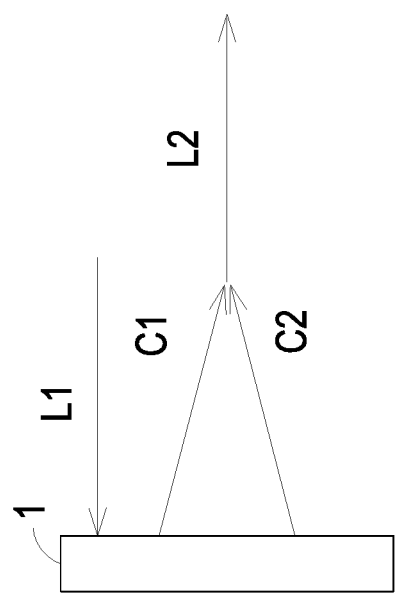

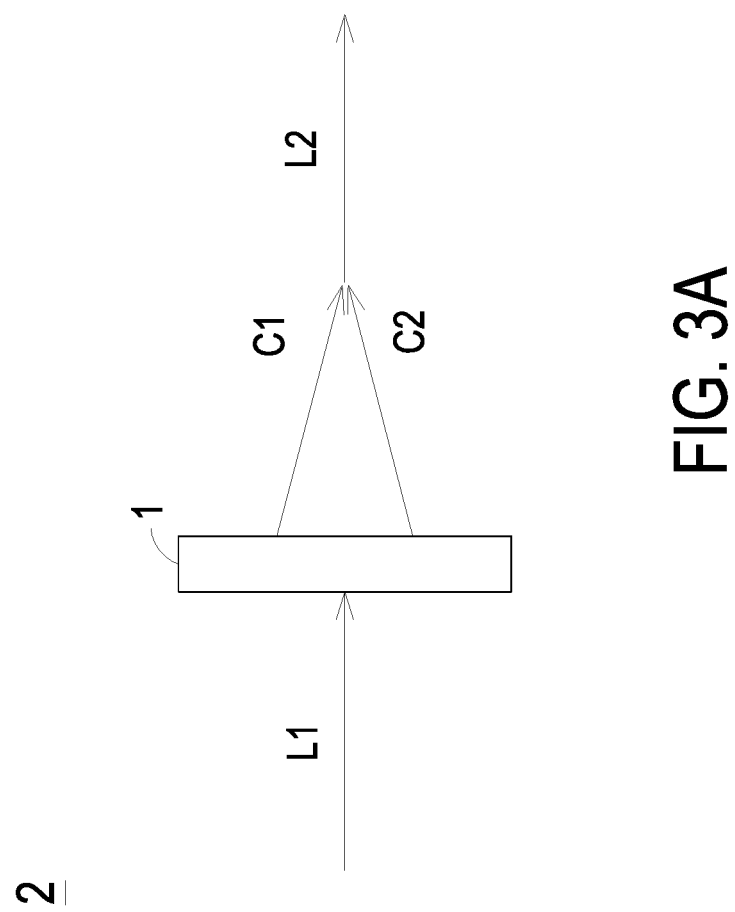

PHOSPHOR DEVICE COMPRISING PLURAL PHOSPHOR AGENTS FOR CONVERTING WAVEBAND LIGHT INTO PLURAL COLOR LIGHTS WITH DIFFERENT WAVELENGTH PEAKS

CROSS-REFERENCE TO RELATED APPLICATION

This application claims the benefit of U.S. Provisional Application No. 62/770,401 filed on Nov. 21, 2018, and claims priority of Chinese Application No. 201910227727.6 filed on Mar. 25, 2019. This application is also a continuation-in-part application of U.S. application Ser. No. 15/403,995 filed on Jan. 11, 2017, which is a continuation-in-part application of U.S. application Ser. No. 14/979,128 filed on Dec. 22, 2015, which is a continuation-in-part application of U.S. application Ser. No. 14/478,579 filed on Sep. 5, 2014, which is a continuation application of U.S. application Ser. No. 13/617,201 filed on Sep. 14, 2012 that claims the benefit of U.S. Provisional Application No. 61/537,687 filed on Sep. 22, 2011. Each of the aforementioned patent applications is incorporated herein by reference.

FIELD OF THE INVENTION

The present disclosure relates to a phosphor device, and more particularly to a phosphor device applied to an illumination system.

BACKGROUND OF THE INVENTION

In recent years, a variety of projectors have been widely used in various video applications. For example, projectors can be used for making presentations, holding meetings or giving lectures in classrooms, boardrooms, conference rooms or home theaters. By the projector, an image signal from an image signal source can be enlarged and shown on a display screen. For reducing power consumption and overall volume, the illumination system of the current projector employs a solid-state light-emitting element (e.g. light emitting diode or laser diode) to replace the conventional high intensity discharge (HID) lamp.

Generally, the illumination system of the projector may emit three primary color lights, i.e. red light (R), green light (G) and blue light (B). Among the architecture of emitting red light, a solid-state light-emitting elements is commonly used to emit an excitation light to a wavelength conversion device (e.g. a phosphor color wheel) coated with a yellow phosphor agent, and the light is filtered through a filter to obtain the desired red light. However, in this architecture, the purity of the red light obtained is not good, and the conversion efficiency is not good.

In another commonly used architecture, a solid-state light-emitting element is used to emit an excitation light to a wavelength conversion device coated with a red phosphor agent, so as to emit red light, but the thermal stability of this architecture is poor. In addition, a solid-state light-emitting element can also be used to directly emit red laser light to obtain high-purity red light. However, the cost of manufacturing such architecture is expensive, and an additional cooling system is required, so the cost involved is high.

For overcoming the drawbacks of the conventional technologies, there is a need of providing an improved phosphor device.

SUMMARY OF THE INVENTION

An object of the present disclosure provides a phosphor device to address the issues encountered by the prior arts.

In accordance with an aspect of the present disclosure, there is provided a phosphor device. The phosphor layer of the phosphor device includes a first phosphor agent and a second phosphor agent, and through converting the first waveband light into a second waveband light integrated by a first color light and a second color light having specific wavelength peaks, the advantages of increasing the purity, the luminance and the luminous intensity of the specific color light are achieved.

In accordance with another aspect of the present disclosure, there is provided phosphor device. By utilizing the first phosphor agent emitting light having a wavelength peak within a specific range, the emitted light thereof absorbed as an absorption spectrum for the second phosphor agent is reduced, and the conversion efficiency is enhanced, such that the purity and luminous intensity of the specific color light are increased, and the thermal stability is good.

In accordance with another aspect of the present disclosure, there is provided a phosphor device. By utilizing the second phosphor emitting light having a wavelength peak within a specific range and having a high luminous coefficient, the luminance and the purity of the specific color light can be effectively enhanced.

In accordance with another aspect of the present disclosure, there is provided a phosphor device. Since the reflective substrate has at least two reflective spectra, the reflectance spectrum corresponded to a specified color light can be specified for providing the phosphor device has a reflectivity corresponded to all waveband greater than the reflectivity corresponded to all waveband of aluminum, and further the max outputs of each waveband are provided.

In an embodiment, the phosphor device of an illumination system emitting a first waveband light includes a substrate and a phosphor layer. The phosphor layer is formed on the substrate for converting the first waveband light into a second waveband light, and the phosphor layer includes a first phosphor agent and a second phosphor agent. The first waveband light is converted into a first color light by the first phosphor agent, and the first color light has a first wavelength peak. The second phosphor agent is distributed over the first phosphor agent and mixed with the first phosphor agent. The first waveband light is converted into a second color light by the second phosphor agent, and the second color light has a second wavelength peak. The first color light and the second color light are integrated into the second waveband light. The difference between the first wavelength peak and the second wavelength peak is larger than or equal to 50 nanometers, and less than or equal to 100 nanometers.

In an embodiment, the phosphor device of an illumination system emitting a first waveband light includes a substrate and a phosphor layer. The phosphor layer is formed on the substrate for converting the first waveband light into a second waveband light, and the phosphor layer includes a first phosphor agent and a second phosphor agent. The first waveband light is converted into a first color light by the first phosphor agent, and the first color light has a first wavelength peak. The second phosphor agent is distributed over the first phosphor agent and mixed with the first phosphor agent. The first waveband light is converted into a second color light by the second phosphor agent, and the second color light has a second wavelength peak. The first color light and the second color light are integrated into the second waveband light, and the wavelength peak of the second waveband light is between the first wavelength peak and the second wavelength peak. The ratio of the weight of the first phosphor agent to the second phosphor agent is 2 to 15.

In an embodiment, the phosphor device of an illumination system emitting a first waveband light includes a substrate and a phosphor layer. The phosphor layer is formed on the substrate for converting the first waveband light into a second waveband light, and the phosphor layer includes a first phosphor agent and a second phosphor agent. The first waveband light is converted into a first color light by the first phosphor agent, and the first color light has a first wavelength peak. The second phosphor agent is distributed over the first phosphor agent and mixed with the first phosphor agent. The first waveband light is converted into a second color light by the second phosphor agent, and the second color light has a second wavelength peak. The first color light and the second color light are integrated into the second waveband light. The first wavelength peak is larger than or equal to 540 nanometers, and less than or equal to 570 nanometers. The second wavelength peak is larger than or equal to 600 nanometers, and less than or equal to 640 nanometers.

In an embodiment, the phosphor device of an illumination system emitting a first waveband light includes a substrate and a phosphor layer. The phosphor layer is formed on the substrate for converting the first waveband light into a second waveband light, and the phosphor layer includes a first phosphor agent and a second phosphor agent. The first waveband light is converted into a first color light by the first phosphor agent. The second phosphor agent is distributed over the first phosphor agent and mixed with the first phosphor agent, and the first waveband light is converted into a second color light by the second phosphor agent. The first color light and the second color light are integrated into the second waveband light, and the range of the spectrum of the first color light is at least partially overlapped with the range of the spectrum of the second color light. The full width at half maximum of the spectrum of the first color light is less than 120 nanometers, and the full width at half maximum of the spectrum of the second color light is less than 90 nanometers.

In an embodiment, the phosphor device of an illumination system emitting a first waveband light includes a substrate, a phosphor layer, a reflective layer and a third phosphor agent. The substrate includes a first section and a second section. The phosphor layer is formed on the first section for converting the first waveband light into a second waveband light, and the phosphor layer includes a first phosphor agent and a second phosphor. The first waveband light is converted into a first color light by the first phosphor agent, and the first color light has a first wavelength peak. The second phosphor agent is distributed over the first phosphor agent and mixed with the first phosphor agent. The first waveband light is converted into a second color light by the second phosphor agent, and the second color light has a second wavelength peak. The reflective layer is disposed between the first section of the substrate and the phosphor layer, and the reflective layer has a reflectance spectrum with a reflectivity corresponded to the second color light greater than the reflectivity corresponded to the second color light of aluminum. The third phosphor agent is formed on the second section, and the first waveband light is converted into a third waveband light by the third phosphor agent. The first color light and the second color light are integrated into the second waveband light. The difference between the first wavelength peak and the second wavelength peak is larger than or equal to 50 nanometers, and less than or equal to 100 nanometers.

In an embodiment, the phosphor device of an illumination system emitting a first waveband light includes a substrate, a phosphor layer and a reflective layer. The phosphor layer is formed on the substrate for converting the first waveband light into a second waveband light, and the phosphor layer includes a first phosphor agent and a second phosphor agent. The first waveband light is converted into a first color light by the first phosphor agent, and the first color light has a first wavelength peak. The second phosphor agent is converted into a second color light by the second phosphor agent, and the second color light has a second wavelength peak. The second phosphor agent is distributed over the first phosphor layer with an average distribution or a gradient distribution, or the second phosphor agent is mixed with the first phosphor agent as a mixture. The weight percentage of the second phosphor agent is less than 85% relative to the first phosphor agent. The reflective layer is for reflecting at least the second waveband light. The first color light and the second color light are integrated into the second waveband light, and the range of the spectrum of the first color light is at least partially overlapped with the range of the spectrum of the second color light. The difference between the first wavelength peak and the second wavelength peak is larger than or equal to 50 nanometers, and less than or equal to 100 nanometers.

The above contents of the present disclosure will become more readily apparent to those ordinarily skilled in the art after reviewing the following detailed description and accompanying drawings, in which:

BRIEF DESCRIPTION OF THE DRAWINGS

FIG. 1A schematically illustrates the concept of an illumination system with a phosphor device according to an embodiment of the present disclosure;

FIG. 3A schematically illustrates the concept of an illumination system with a phosphor device according to another embodiment of the present disclosure;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1B:
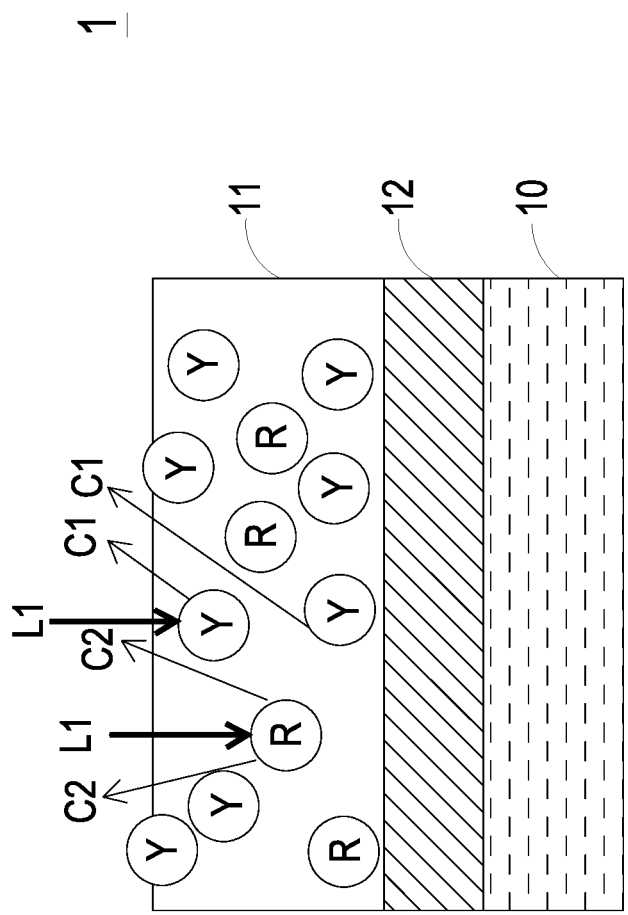
FIG. 1B schematically illustrates the structure of a phosphor device shown in FIG. 1A.
Figure 2:
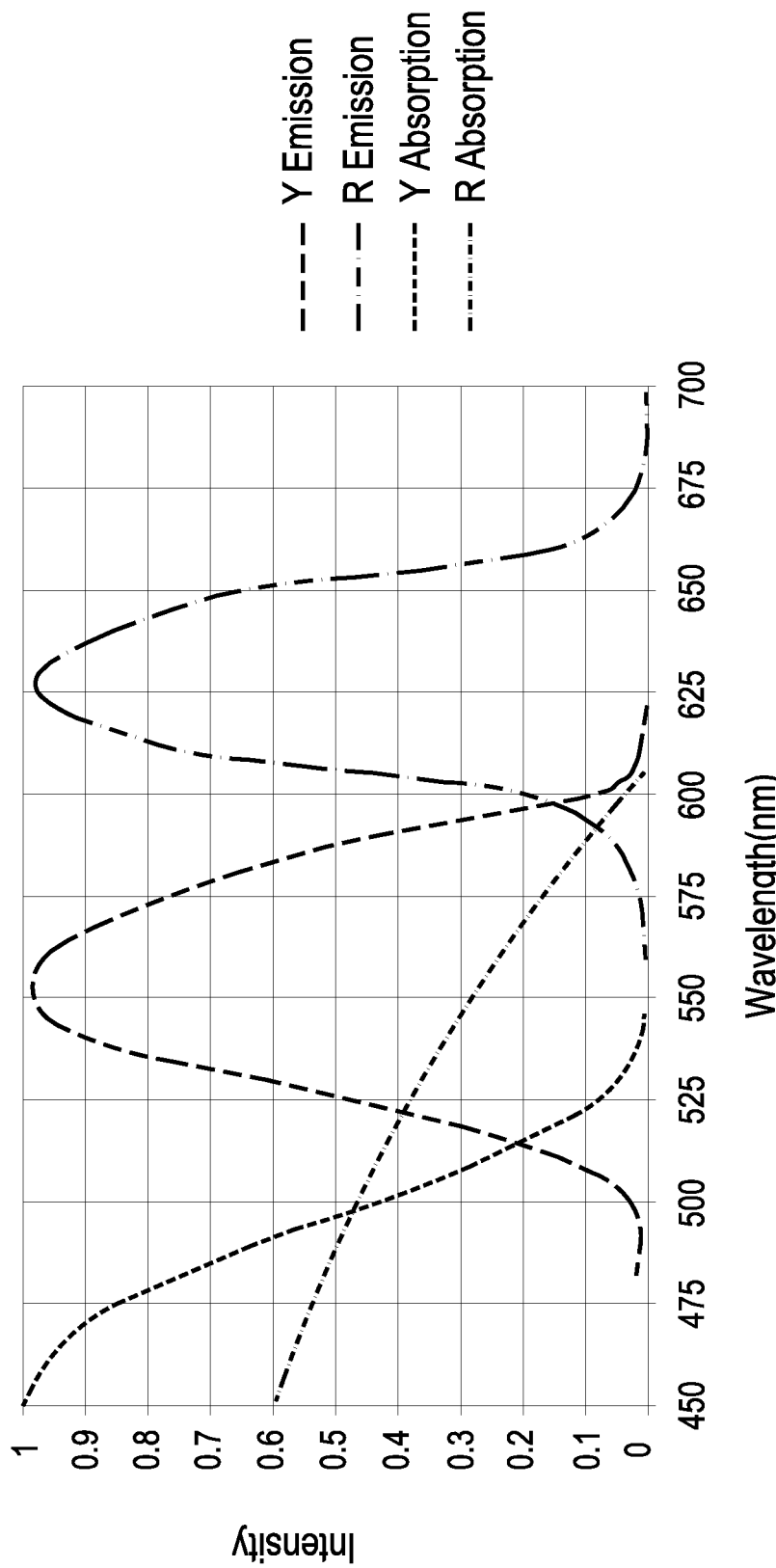
FIG. 2 schematically illustrates the absorption spectra and the emission spectra of a first phosphor agent and a second phosphor agent of a phosphor device according to an embodiment of the present disclosure.

Please refer to FIG. 1A, FIG. 1B, and FIG. 2. FIG. 1A schematically illustrates the concept of an illumination system with a phosphor device according to an embodiment of the present disclosure. FIG. 1B schematically illustrates the structure of a phosphor device shown in FIG. 1A. FIG. 2 schematically illustrates the absorption spectra and the emission spectra of a first phosphor agent and a second phosphor agent of a phosphor device according to an embodiment of the present disclosure. As shown in FIG. 1, FIG. 1B and FIG. 2, the phosphor device 1 is used in an illumination system 2 that emits a first waveband light L1. The phosphor device 1 includes a substrate 10 and a phosphor layer 11, and the substrate 10 is a reflective substrate. The phosphor layer 11 is formed on the substrate 10 for converting the first waveband light L1 into a second waveband light L2. The first waveband light L1 can be blue light or ultraviolet light, and the second waveband light L2 can be orange light, but not limited herein. In addition, the substrate 10 can be a substrate having no optical characters, such as a ceramic substrate on which the phosphor layer 11 can be disposed.

The phosphor layer 11 includes a first phosphor agent Y and a second phosphor agent R. The first waveband light L1 is converted into a first color light C1 by the first phosphor agent Y, and the spectrum shown by the first color light C1 has a specific wavelength range and includes a first wavelength peak. The composition of the second phosphor agent R is distributed over the first phosphor agent Y and mixed with the first phosphor agent Y. The first waveband light L1 is converted into a second color light C2 by the second phosphor agent R, and the spectrum shown by the second color light C2 has a specific wavelength range and includes a second wavelength peak. The first color light C1 and the second color light C2 are integrated into the second waveband light L2. The difference between the first wavelength peak and the second wavelength peak is larger than or equal to 50 nanometers, and less than or equal to 100 nanometers. Furthermore, the wavelength peak of the second waveband light L2 is between the first wavelength peak of the first color light C1 and the second wavelength peak of the second color light C2. Besides, the first color light C1 and the second color light C2 in the figures are shown separately and then concentrated in the traveling direction for the purpose of expressing that they are integrated into the second waveband light L2. In other words, the second waveband light L2 refers to the entirety of the first color light C1 and the second color light C2 emitted from the phosphor device 1.

In this embodiment and the following embodiments, the first phosphor agent Y can be a yellow phosphor agent, and includes YAG materials, so that the first waveband light L1 is converted into the first color light C1, which is shown as yellow light, by the first phosphor agent Y. The second phosphor agent R can be a red phosphor agent, and includes nitride phosphor materials, so that the first waveband light L1 is converted into the second color light C2, which is shown as red light, by the second phosphor agent R. The first color light C1 shown as yellow light and the second color light C2 shown as red light are integrated into the second waveband light L2, which is shown as orange light, and the range of the spectrum of the first color light C1 is at least partially overlapped with the range of the spectrum of the second color light C2. Therefore, the purity, the luminance and the luminous intensity of the red light outputted by the light source system 2 after being filtered are enhanced. In some embodiments, the full width at half maximum (FWHM) of the spectrum of the first color light C1 emitted though the conversion of the first phosphor agent Y is less than 120 nanometers, and the full width at half maximum of the spectrum of the second color light C2 emitted through the conversion of the second color agent R is less than 90 nanometers, thereby obtaining the light with higher light purity, but not limited herein.

In some embodiments, the second phosphor agent R can be distributed over the first phosphor layer Y with an average distribution or a gradient distribution, or the second phosphor agent R can be mixed with the first phosphor agent Y as a mixture. Preferably, the ratio of the weight of the first phosphor agent Y to the second phosphor agent R is 2 to 15. Alternatively, the weight percentage of the second phosphor agent R is less than 85% relative to the first phosphor agent Y. Therefore, the purity, the luminance and the luminous intensity of the red light outputted by the light source system 2 after being filtered are effectively enhanced, but not limited herein.

In some embodiments, the phosphor device 1 further includes a reflective layer 12 disposed between the substrate 10 and the phosphor layer 11, so that at least the second waveband light L2 is reflected by the reflective layer 12. In some embodiments, the reflective layer 12 can be, for example but not limited to, a diffuse reflective layer consisting of at least one of white glue and inorganic metal oxide particles such as $SiO_2$, $TiO_2$, $Al_2O_3$, $ZrO_2$, ZnO and BN particles, and all of visible light is reflected by diffuse reflective layer, so as to increase the overall light output efficiency, among which the thickness of the diffuse reflective layer can be 20 to 150 micrometers, but not limited herein. In some embodiments, the reflective layer 12 has a reflectance spectrum with a reflectivity corresponded to the second color light greater than the reflectivity corresponded to the second color light of aluminum, thereby enhancing the luminous intensity of the second color light C2, and the reflective layer 12 can be a dielectric film layer, but not limited herein.

Figure 3B:
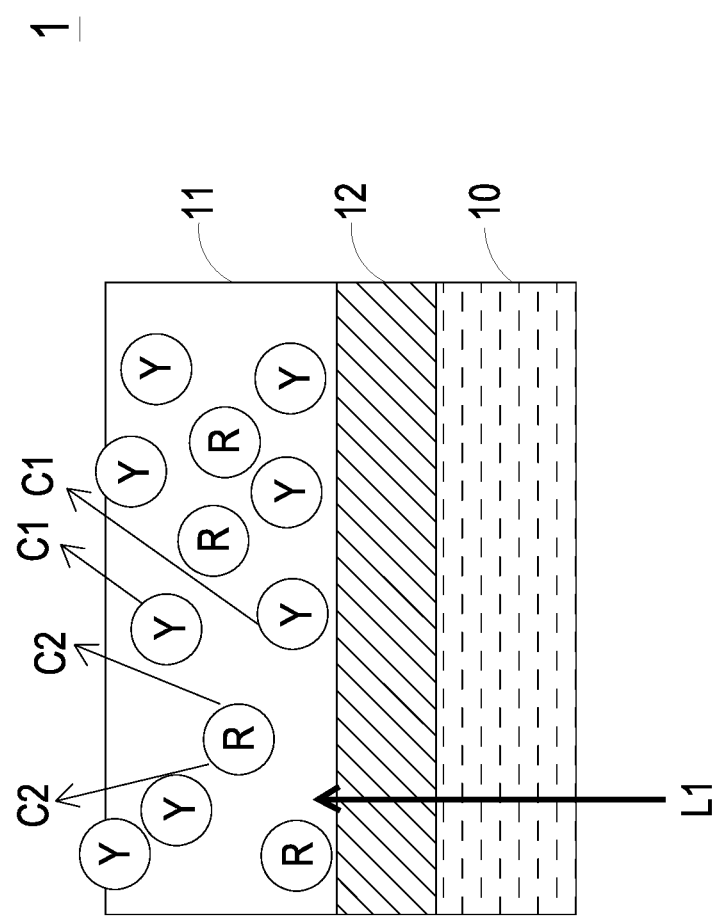
FIG. 3B schematically illustrates the structure of a phosphor device shown in FIG. 3A.

Please refer to FIG. 3A and FIG. 3B. FIG. 3A schematically illustrates the concept of an illumination system with a phosphor device according to another embodiment of the present disclosure. FIG. 3B schematically illustrates the structure of a phosphor device shown in FIG. 3A. As shown in FIGS. 3A and 3B, the phosphor device 1 is used in an illumination system 2 that emits a first waveband light L1. The phosphor device 1 includes a substrate 10 and a phosphor layer 11, and the substrate 10 is a transmissive substrate. The phosphor layer 11 is formed on the substrate 10 for converting the first waveband light L1 into a second waveband light L2, which is obtained from integrating the first color light C1 and the second color light C2. The features of the phosphor layer 11 and respective color light are identical to the previous embodiments, and it is not redundantly described herein. In this embodiments, the phosphor device 1 further includes a reflective layer 12 disposed between the substrate 10 and the phosphor layer 11 for reflecting least the second waveband light L2. In some embodiments, the reflective layer 12 is a dichroic layer, and at least the first color light C1 and the second color light C2 are reflected by the dichroic layer, or a color light having the similar range of wavelength with the second waveband light L2 is reflected by the dichroic layer, but not limited herein. Practically, the dichroic layer can be designed to reflect a desired wavelength range depends on different conditions.

In other words, in the phosphor device of the present disclosure, the phosphor layer of the phosphor device includes a first phosphor agent and a second phosphor agent, and through converting the first waveband light into a second waveband light integrated by a first color light and a second color light having specific wavelength peaks, the advantages of increasing the purity, the luminance and the luminous intensity of the specific color light are achieved.

Figure 4A:
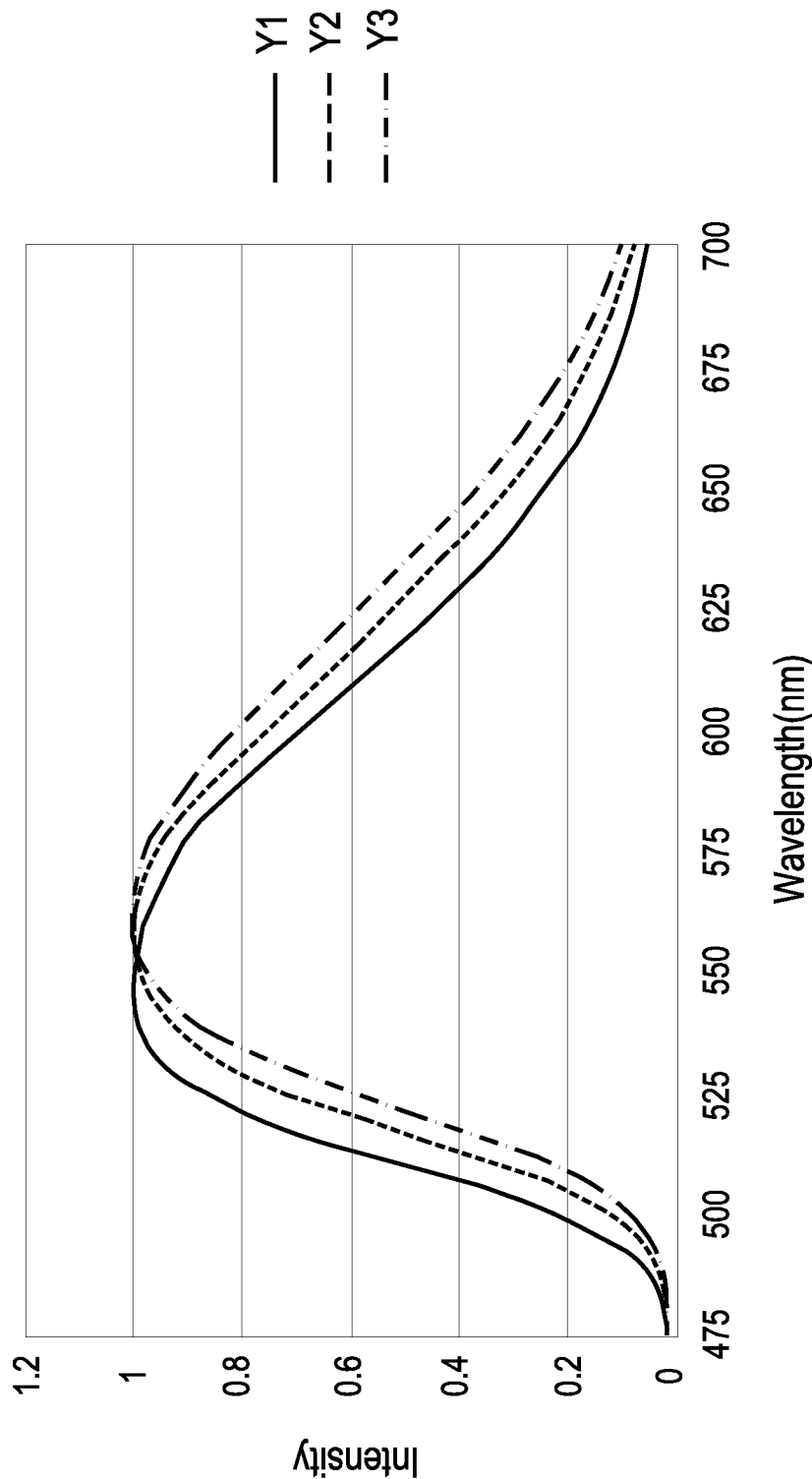
FIG. 4A schematically illustrates the emission spectra of the first phosphor agents of different embodiments.
Figure 4B:
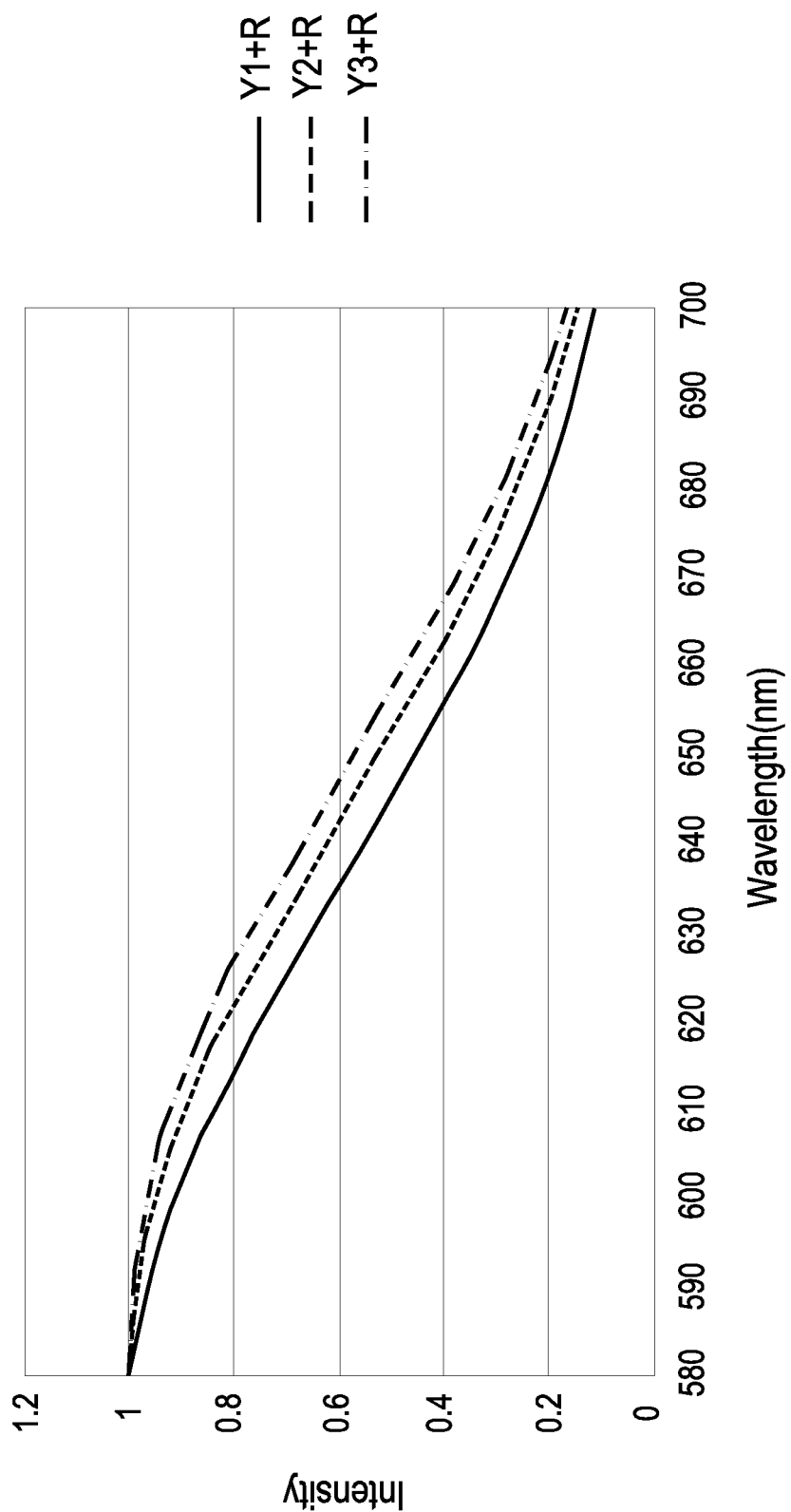
FIG. 4B schematically illustrates the emission spectra of the first phosphor agents of different embodiments mixed with the second phosphor agent.

Please refer to FIG. 2, FIG. 4A and FIG. 4B. FIG. 4A schematically illustrates the emission spectra of the first phosphor agents of different embodiments. FIG. 4B schematically illustrates the emission spectra of the first phosphor agents of different embodiments mixed with the second phosphor agent. As shown in FIG. 2, and FIG. 4A and FIG. 4B, in the first color light C1 emitted though the conversion of the first phosphor agent Y, part of the emitted light may be used as the absorption spectrum by the second phosphor agent R. Therefore, in order to reduce the absorption of the emitted light by the second phosphor agent R, there is a need to select the first phosphor agent Y emitting the light having a longer waveband and wavelength peak, so as to be mixed with the second phosphor agent R.

The first phosphor agents Y1, Y2 and Y3 emitting the first color light C1 having different waveband lengths are provided, and the wavelength peaks of the emitted light thereof is Y1<Y2<Y3, as shown in FIG. 4A. Furthermore, the first phosphor agents Y1, Y2 and Y3 are respectively mixed with the second phosphor agent R, and the light intensity of the red light thereof obtained at the color point Rx=0.670 is compared with the light intensity of the red light of the first phosphor agent Y1, which is not mixed with the second phosphor agent R, so as to obtain the output efficiency as shown in FIG. 4B and the following Table 1. According to the test results, the first phosphor agent Y3 emitting the first color light C1 having longer waveband and wavelength peak is selected to be mixed with the second phosphor agent R, so that the red light having higher intensity and purity is obtained.

TABLE 1

| Mixed phosphor agents | Intensity of red light of the mixed phosphor agents/Intensity of red light of the first phosphor agent Y1 |
|---|---|
| first phosphor agent Y1 + second phosphor agent R | 120% |
| first phosphor agent Y2 + second phosphor agent R | 128% |
| first phosphor agent Y3 + second phosphor agent R | 132% |

Figure 5A:
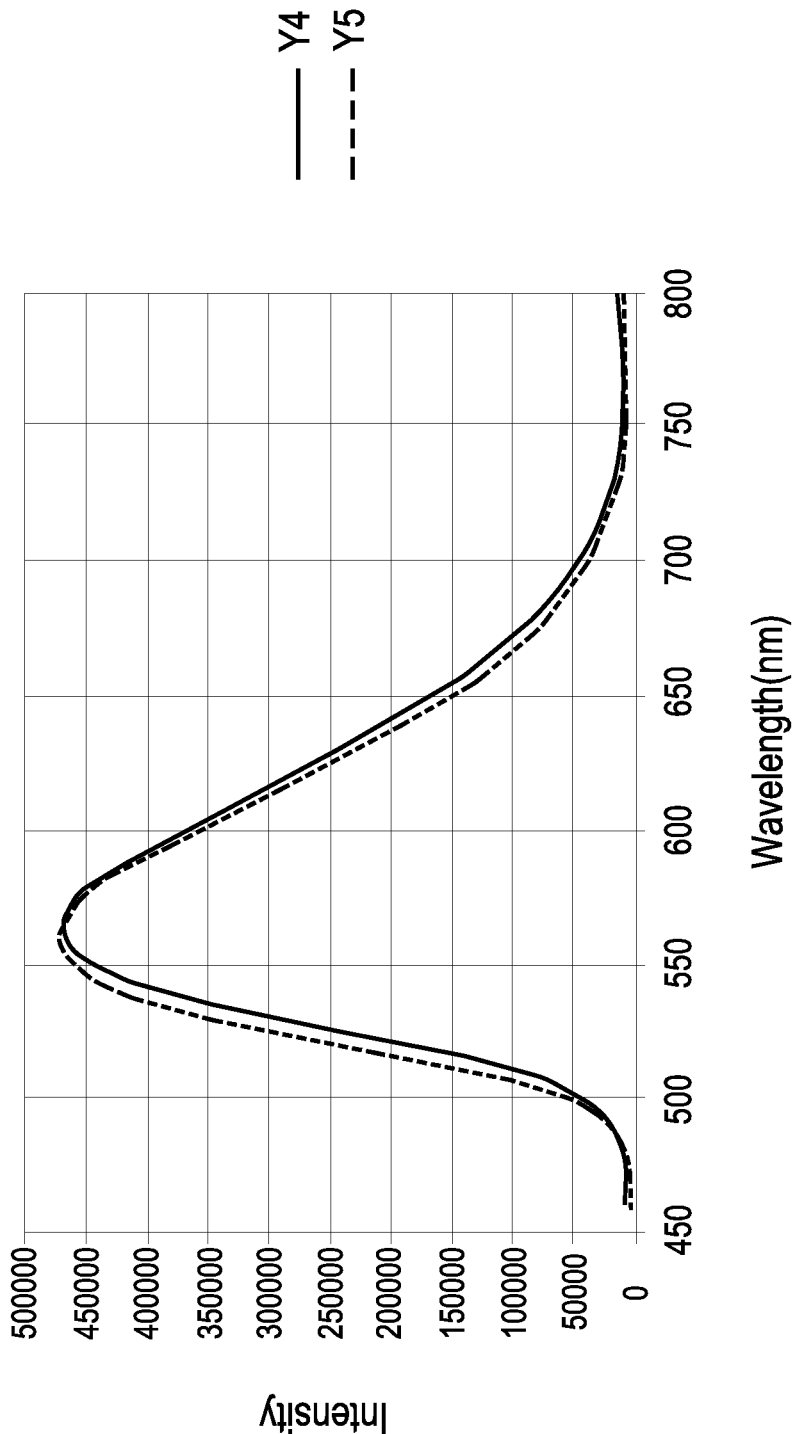
FIG. 5A schematically illustrates the emission spectra of the first phosphor agents doped with Ce of different embodiments at low wattages.
Figure 5B:
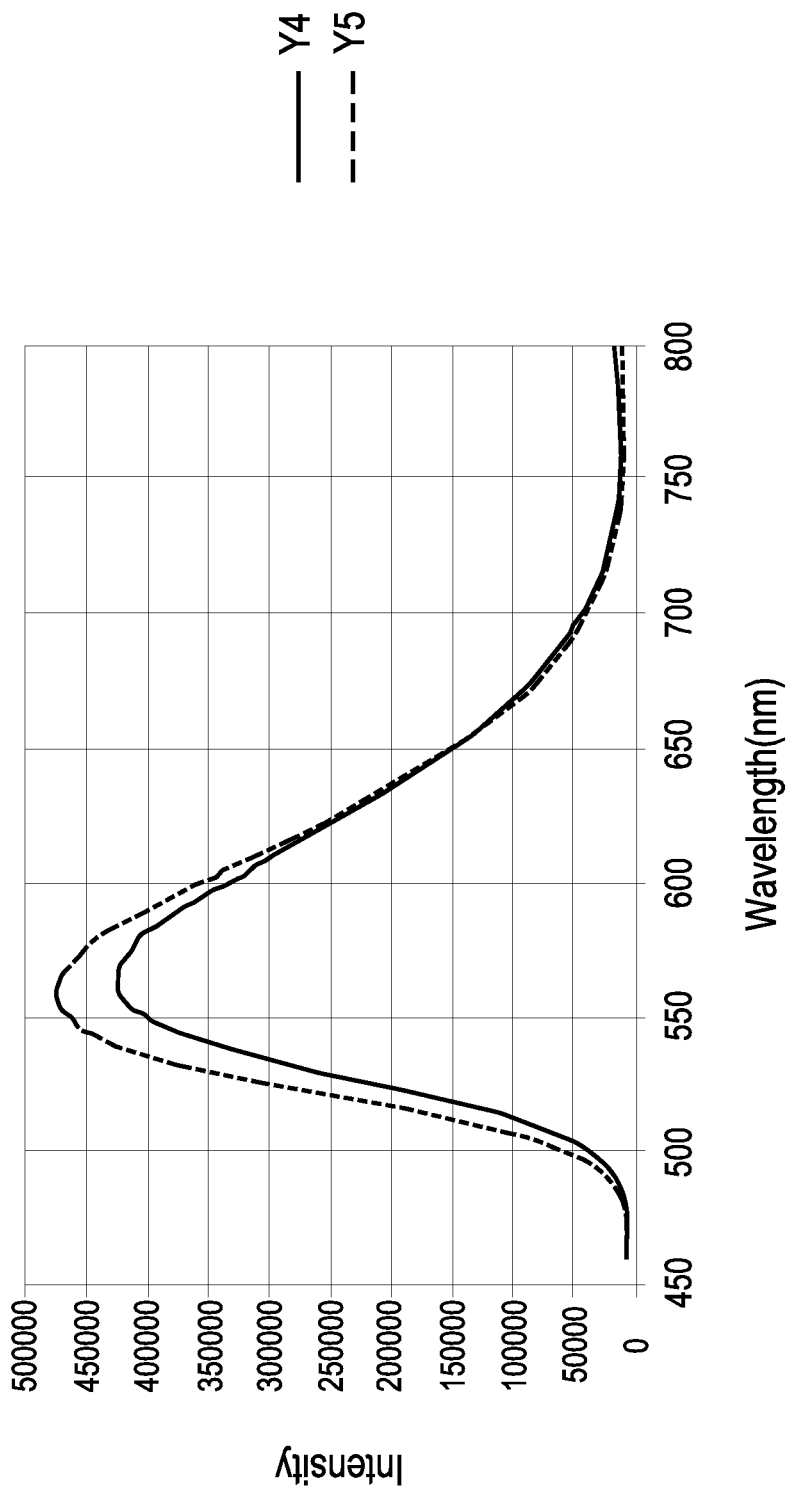
FIG. 5B schematically illustrates the emission spectra of the first phosphor agents doped with Ce of different embodiments at high wattages.

Please refer to FIG. 5A and FIG. 5B. FIG. 5A schematically illustrates the emission spectra of the first phosphor agents doped with Ce of different embodiments at low wattages which means lower radiant pumping power to the phosphor agent. FIG. 5B schematically illustrates the emission spectra of the first phosphor agents doped with Ce of different embodiments at high wattages with higher radiant pumping power. In some embodiments, the first phosphor agent Y can includes the Ce-doped YAG material ($Y_3Al_5O_{12}$). When the Ce doping amount is increased, the emission spectrum of the first phosphor agent Y is red-shifted, that is, the wavelength peak of the waveband of the emitted first color light C1 is longer, thereby reducing the absorption of the emitted light by the second phosphor agent R. However, as the Ce doping amount is increased, the defect areas are also increased, which makes the thermal stability worse.

The first phosphor agents Y4 and Y5 emitting the first color light C1 having different waveband lengths due to different Ce doping amounts are provided, the Ce doping amounts thereof is Y4>Y5, and the wavelength peaks of the emitted light thereof is Y4>Y5. Furthermore, the first phosphor agents Y4 and Y5 are applied to the low wattage architecture (about 100 watts) and the high wattage architecture (about 200 watts). According to the test results, in the case of low wattage and low thermal influence, as shown in FIG. 5A, the obtained red light intensity having a wavelength of about 600 nm or more is that Y5 is less than Y4 by about 20%. In the case of high wattage and high thermal influence, as shown in FIG. 5B, the obtained red light intensity having a wavelength of about 600 nm or more is that Y4 is less than Y5 by about 10%. That is to say, at the low wattage, the first phosphor agent Y, which has a larger Ce doping amount and emits the first color light C1 having longer waveband and wavelength peak, can be selected. At the high wattage, since the thermal influence caused by the defects should be considered, the first phosphor agent Y should not be doped with too much Ce, so there is an upper limit for the length of the waveband and the wavelength peak of the first color light C1 emitted by the first phosphor agent Y.

Through considering the effects to the intensity and the purity of the red light due to the factors of the waveband length, the Ce doping amount and the light wattage, preferably, the first phosphor agent Y emitting the color light having the wavelength peak of 540-570 nanometers is selected, that is, the first wavelength peak of the first color C1 is larger than or equal to 540 nanometers, and less than or equal to 570 nanometers. Optimally, the first phosphor agent Y emitting the color light having the wavelength peak of 550-560 nanometers is selected, that is, the first wavelength peak of the first color C1 is larger than or equal to 550 nanometers, and less than or equal to 560 nanometers.

In other words, in the phosphor device of the present disclosure, by utilizing the first phosphor agent emitting light having a wavelength peak within a specific range, the emitted light thereof absorbed as an absorption spectrum for the second phosphor agent is reduced, and the conversion efficiency is enhanced, such that the purity and luminous intensity of the specific color light are increased, and the thermal stability is good.

Figure 6:
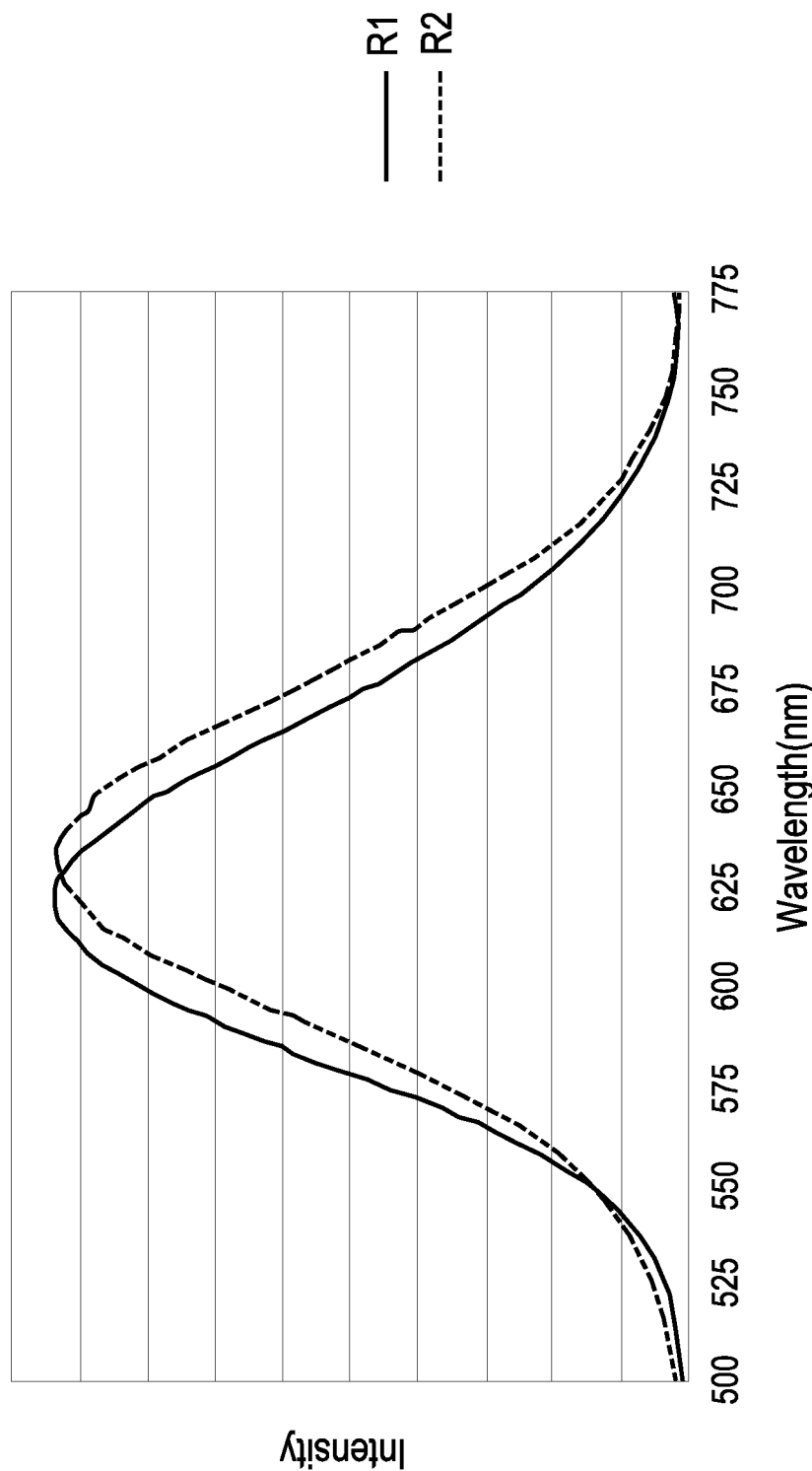
FIG. 6 schematically illustrates the emission spectra of the second phosphor agents of different embodiments.

Please refer to FIG. 6. FIG. 6 schematically illustrates the emission spectra of the second phosphor agents of different embodiments. According to the spectral luminous efficiency, due to the stimulation of colors to the vision of human eyes, different luminance effect is produced by the color lights of different wavebands, and the luminous coefficient of yellow-green light is the highest. The second phosphor agents R1 and R2 emitting the second color light C2 with different waveband lengths are provided, and the light-emitting performance obtained is as shown in FIG. 6 and the following Table 2. According to the test results, the light wattages emitted by the second phosphor agents R1 and R2 are almost the same, but the performance on the luminance has a difference of about 10%, which is mainly due to the effect of the luminous coefficient. In other words, the second phosphor agent R1 emitting the second color light C2 having the waveband length being close to yellow-green light is selected to be mixed with the first phosphor agent Y, so that the red light having higher luminance is obtained.

TABLE 2

|  | Second phosphor agent R1 | Second phosphor agent R2 |
|---|---|---|
| Light wattage (W) | 18.9 | 19.1 |
| Luminous flux (lm) | 5140 | 4660 |
| Wavelength peak (nm) | 624 | 636 |

Figure 7:
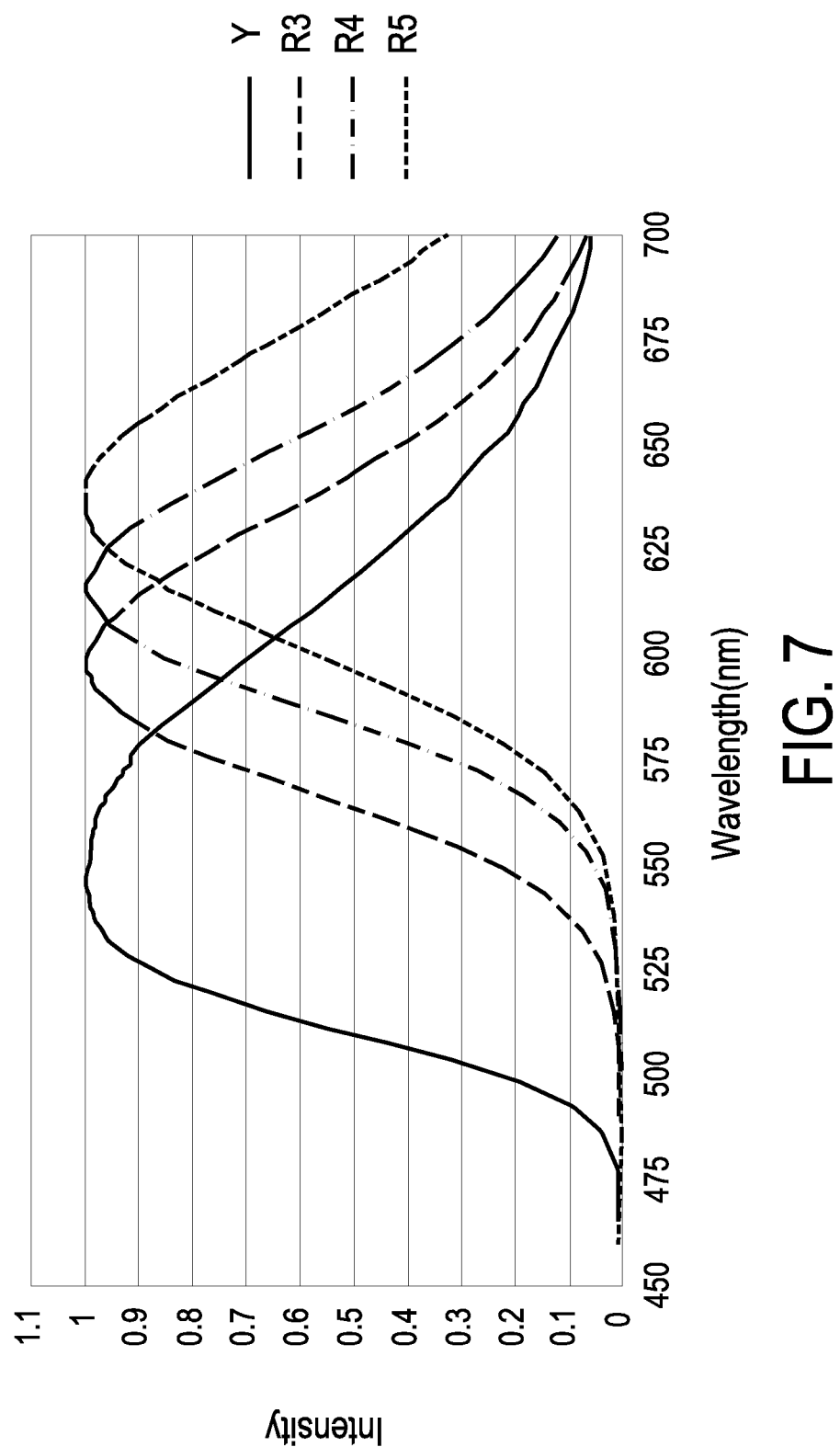
FIG. 7 schematically illustrates the emission spectra of the first phosphor agent and the second phosphor agents of different embodiments.

Please refer to FIG. 7. FIG. 7 schematically illustrates the emission spectra of the first phosphor agent and the second phosphor agents of different embodiments. The second phosphor agents R3, R4 and R5 emitting the second color light C2 with different waveband lengths are provided, and the wavelength peaks of the emitted light thereof is R3<R4<R5. The light intensity and the output efficiency of the first phosphor agent Y and the second phosphors agents R3, R4 and R5 are as shown in FIG. 7 and the following Table 3. According to the test results, the red light intensity of the second phosphor agent R3 emitting the light having the wavelength peak being close to 600 nanometers is lower, and the red light luminance of the second phosphor agent R5 emitting the light having the wavelength peak being close to 640 nanometers is lower.

TABLE 3

|  | Wavelength peak (nm) | Luminance efficiency (lm/W) ratio | Color point x | Color point y |
|---|---|---|---|---|
| First phosphor agent Y | 540 | 100% | 0.669 | 0.330 |
| Second phosphor agent R3 | 600 | 109% | 0.670 | 0.329 |
| Second phosphor agent R4 | 620 | 119% | 0.670 | 0.330 |
| Second phosphor agent R5 | 638 | 90% | 0.672 | 0.328 |

Through considering the effects to the intensity and the purity of the red light due to the factors of the luminous coefficient and the waveband length, preferably, the second phosphor agent R emitting the color light having the wavelength peak of 600-640 nanometers is selected, that is, the second wavelength peak of the second color C2 is larger than or equal to 600 nanometers, and less than or equal to 640 nanometers. Optimally, the second phosphor agent R emitting the color light having the wavelength peak of 600-630 nanometers is selected, that is, the second wavelength peak of the second color C2 is larger than or equal to 600 nanometers, and less than or equal to 630 nanometers.

In other words, in the phosphor device of the present disclosure, by utilizing the second phosphor emitting light having a wavelength peak within a specific range and having a high luminous coefficient, the luminance and the purity of the specific color light can be effectively enhanced.

The first phosphor agent Y emitting the first color light C1 having the wavelength peak within 540-570 nanometers and the second phosphor agent R emitting the second color light C2 having the wavelength peak within 600-640 nanometers are selected, and then the first phosphor agent Y and the second phosphor agent R are mixed and formed on an aluminum substrate having a thickness of 100 mm. Then, the red light intensity test is performed at the color point Rx=0.670 and with different incident light wattages, and it is compared with the red light intensity obtained by using a conventional yellow phosphor agent, thereby obtaining results as shown in the following Table 4. According to the test results, by utilizing the first phosphor agent Y and the second phosphor agent R emitting the light having wavelength peaks within specific ranges to perform mixing, the light intensity of the red light can be effectively enhanced.

TABLE 4

| Wattage of the incident light (W) | red light intensity of the mixed phosphor agents/red light intensity of the yellow phosphor |
|---|---|
| 25 | 192% |
| 76 | 163% |
| 102 | 156% |
| 152 | 127% |
| 170 | 120% |
| 200 | 105% |

Figure 8B:
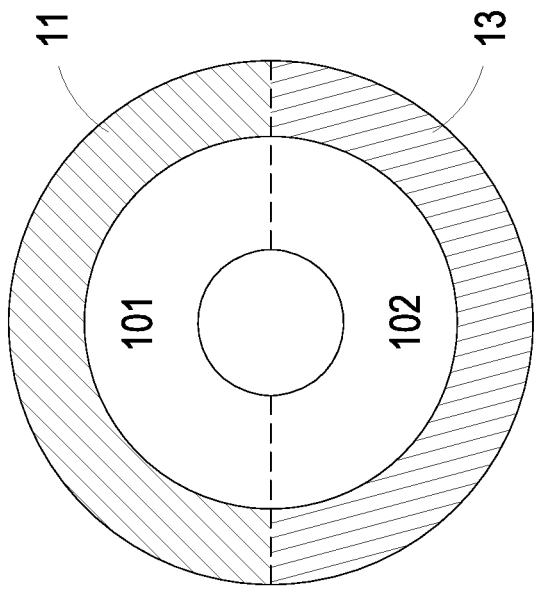
FIG. 8B schematically illustrates the structure of a phosphor device according to another embodiment of the present disclosure.
Figure 8A:
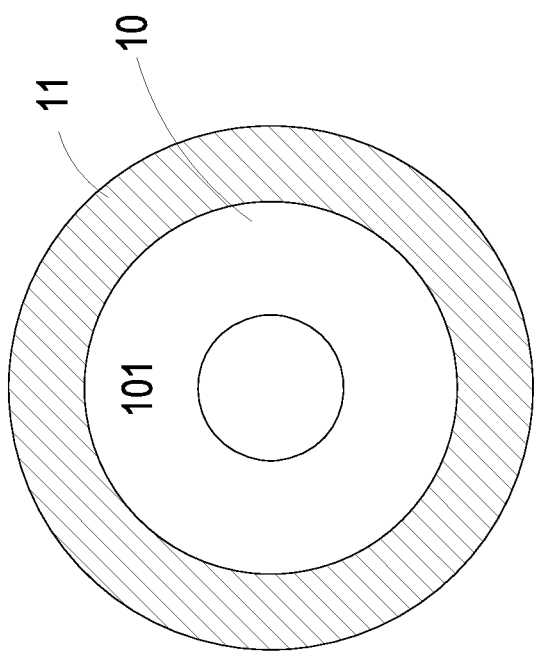
FIG. 8A schematically illustrates the structure of a phosphor device according to an embodiment of the present disclosure.
Figure 8C:
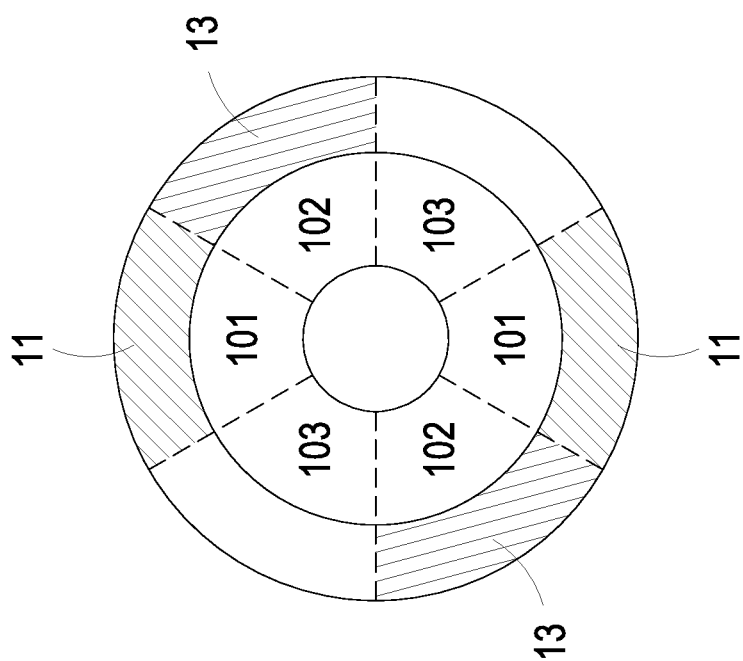
FIG. 8C schematically illustrates the structure of a phosphor device according to another embodiment of the present disclosure.

Please refer to FIG. 8A, FIG. 8B and FIG. 8C, and also refer to FIG. 1A, FIG. 1B, FIG. 3A and FIG. 3B. FIG. 8A schematically illustrates the structure of a phosphor device according to an embodiment of the present disclosure. FIG. 8B schematically illustrates the structure of a phosphor device according to another embodiment of the present disclosure. FIG. 8C schematically illustrates the structure of a phosphor device according to another embodiment of the present disclosure. In some embodiments, as shown in FIG. 8A, the phosphor device 1 can be a phosphor wheel, and the substrate 10 includes a first section 101. The phosphor layer 11 including the first phosphor agent Y and the second phosphor agent R is formed on the first section 101, so as to convert the first waveband light L1 into the second waveband light L2. The first waveband light L1 is blue light or ultraviolet light, the second waveband light L2 is orange light, the first phosphor agent Y is a yellow phosphor agent, and the second phosphor agent R is a red phosphor agent, but not limited herein. In some embodiments, a stereoscopic structure can be formed on the substrate 10 to increase the thermal turbulence and enhance the output efficiency of the red light.

In some embodiments, as shown in FIG. 8B, the phosphor device 1 further includes a third phosphor agent 13, and the first waveband light L1 is converted into a third waveband light by the third phosphor agent 13. Furthermore, the substrate 10 includes a first section 101 and a second section 102. The phosphor layer 11 including the first phosphor agent Y and the second phosphor agent R is formed on the first section 101, so as to convert the first waveband light L1 into the second waveband light L2. The third phosphor agent 13 is formed on the second section 102, so as to convert the first waveband light L1 into the third waveband light L3. The first waveband light L1 is blue light or ultraviolet light, the second waveband light L2 is orange light, the third waveband light is green light or yellow-green light, the first phosphor agent Y is a yellow phosphor agent, the second phosphor agent R is a red phosphor agent, and the third phosphor agent 13 is a green phosphor agent or a yellow-green phosphor agent, but not limited herein.

In some embodiments, as shown in FIG. 8C, the substrate 10 further includes a third section 103, and the third section 103 is a reflective section or a transparent section for directly reflecting the first waveband light L1 or for the first waveband light L1 to be transmitted through. The transparent section can be, for example, a hollow structure or glass coated with an optical film that the first wavelength band light L1 can be transmitted through, but not limited herein.

Figure 9:
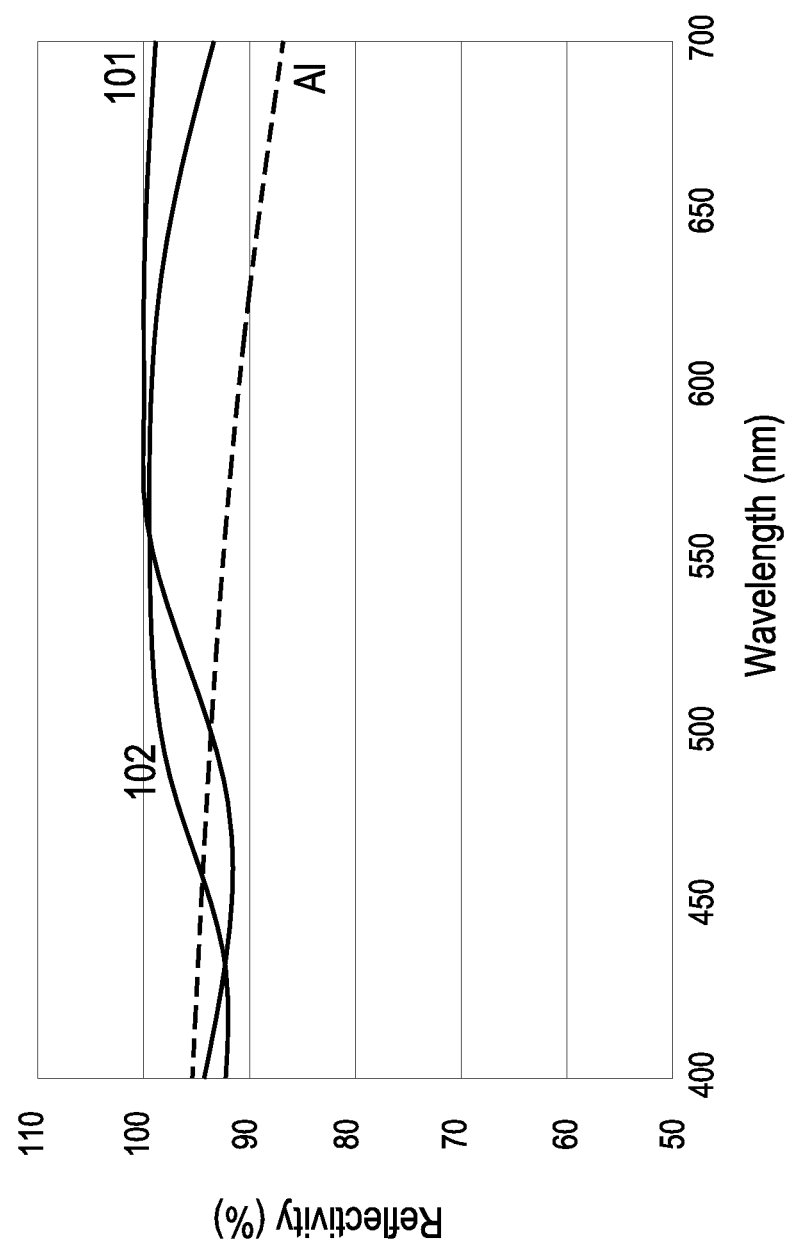
FIG. 9 schematically illustrates the reflection spectra of the first section and the second section shown in FIG. 8B and aluminum.

Please refer to FIG. 1A, FIG. 8B and FIG. 9. FIG. 9 schematically illustrates the reflection spectra of the first section and the second section shown in FIG. 8B and aluminum. In some embodiments, as shown in FIG. 1A, FIG. 8B and FIG. 9, the phosphor device 1 includes the first section 101, the phosphor layer 11 including the first phosphor agent Y and the second phosphor agent R, the second section 102 and the second phosphor agent 13. The first section 101 and the second section 102 are assembled as a reflective substrate. The reflective substrate is a glass substrate, a borosilicate glass substrate, a quartz substrate, a sapphire substrate, a calcium fluoride substrate, a silicon substrate, a silicon carbide substrate, a graphene thermally conductive substrate, an aluminum oxide substrate, a boron nitride substrate, or a substrate containing at least a metal material, wherein the metal material is aluminum, magnesium, copper, silver or nickel, but not limited herein. The phosphor layer 11 including the first phosphor agent Y and the second phosphor agent R is coated on the first section 101, and the third phosphor agent 13 is coated on the second section 102. One of the first section 101 and the second section 102 has a reflectance spectrum with a reflectivity corresponded to the second color light C2 greater than the reflectivity corresponded to the second color light C2 of aluminum, and the other one of the first section 101 and the second section 102 has a reflectance spectrum with a reflectivity corresponded to the third waveband light greater than the reflectivity corresponded to the third waveband light of aluminum. In particular, a metal reflection layer is formed on the first section 101 and the second section 102 of the reflective substrate, and a first dielectric film layer and a second dielectric film layer are reflectively plated on the metal reflection layer corresponded to the first section 101 and the second section 102 so as to adjust the reflectance spectrum of the metal reflection layer.

Please refer to FIG. 9. It illustrates that the performance of reflectivity of the first dielectric film layer is better than the performance of reflectivity of the second dielectric film layer in the range of the spectrum of red light, and the performance of reflectivity of the second dielectric film layer is better than the performance of reflectivity of the first dielectric film layer in the range of the spectrum of green light. Meanwhile, when the second color light C2 is red light and the third waveband light is green light, obviously the performance of reflectivity of the first section 101 in the range of the spectrum of red light and the performance of reflectivity of the second section 102 in the range of the spectrum of green light are both better than the performances of reflectivity of the first section 101 and the second section 102 only utilized aluminum as the metal reflection layer.

Furthermore, the first phosphor agent Y and the second phosphor agent R included in the phosphor layer 11 can be a yellow phosphor agent and a red phosphor agent, respectively, the third phosphor agent 13 can be a green phosphor agent or a yellow-green phosphor agent, and the output efficiency of the red light of the first section 101 and the output efficiency of the green light of the second section 102 of the phosphor device 1 of the present disclosure are enhanced compared with the output efficiencies of aluminum metal reflection layer of prior art.

In other words, in the phosphor device of the present disclosure, since the reflective substrate has at least two reflective spectra, the reflectance spectrum corresponded to a specified color light can be specified for providing the phosphor device has a reflectivity corresponded to all waveband greater than the reflectivity corresponded to all waveband of aluminum, and further the max outputs of each waveband are provided.

From the above descriptions, the present disclosure provides a phosphor device. The phosphor layer of the phosphor device includes a first phosphor agent and a second phosphor agent, and through converting the first waveband light into a second waveband light integrated by a first color light and a second color light having specific wavelength peaks, the advantages of increasing the purity, the luminance and the luminous intensity of the specific color light are achieved. Furthermore, by utilizing the first phosphor agent emitting light having a wavelength peak within a specific range, the emitted light thereof absorbed as an absorption spectrum for the second phosphor agent is reduced, and the conversion efficiency is enhanced, such that the purity and luminous intensity of the specific color light are increased, and the thermal stability is good. Meanwhile, by utilizing the second phosphor emitting light having a wavelength peak within a specific range and having a high luminous coefficient, the luminance and the purity of the specific color light can be effectively enhanced. In addition, since the reflective substrate has at least two reflective spectra, the reflectance spectrum corresponded to a specified color light can be specified for providing the phosphor device has a reflectivity corresponded to all waveband greater than the reflectivity corresponded to all waveband of aluminum, and further the max outputs of each waveband are provided.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A phosphor device of an illumination system, the illumination system emitting a first waveband light, the phosphor device comprising:
   a substrate; and
   a phosphor layer formed on the substrate for converting the first waveband light into a second waveband light, comprising:
      a first phosphor agent, wherein the first waveband light is converted into a first color light by the first phosphor agent, and the first color light has a first wavelength peak; and
      a second phosphor agent distributed over the first phosphor agent and mixed with the first phosphor agent, wherein the first waveband light is converted into a second color light by the second phosphor agent, and the second color light has a second wavelength peak,
   wherein the first color light and the second color light are integrated into the second waveband light, and wherein the difference between the first wavelength peak and the second wavelength peak is larger than or equal to 50 nanometers, and less than or equal to 100 nanometers.

2. The phosphor device according to claim 1, wherein wavelength peak of the second waveband light is between the first wavelength peak and the second wavelength peak.

3. The phosphor device according to claim 1, wherein the first wavelength peak is larger than or equal to 540 nanometers, and less than or equal to 570 nanometers.

4. The phosphor device according to claim 1, wherein the second wavelength peak is larger than or equal to 600 nanometers, and less than or equal to 640 nanometers.

5. The phosphor device according to claim 1, wherein the first phosphor agent is a yellow phosphor agent, and the second phosphor agent is a red phosphor agent.

6. The phosphor device according to claim 5, wherein the first phosphor agent comprises a Ce-doped YAG material.

7. The phosphor device according to claim 5, wherein the ratio of the weight of the first phosphor agent to the second phosphor agent is 2 to 15.

8. The phosphor device according to claim 1 further comprising a reflective layer disposed between the substrate and the phosphor layer, so that the second waveband light is reflected by the reflective layer.

9. The phosphor device according to claim 8, wherein the reflective layer is a diffuse reflective layer or a dichroic layer.

10. The phosphor device according to claim 8, wherein the reflective layer has a reflectance spectrum with a reflectivity corresponded to the second color light greater than the reflectivity corresponded to the second color light of aluminum.

11. The phosphor device according to claim 1 further comprising a third phosphor agent, wherein the first waveband light is converted into a third waveband light by the third phosphor agent, wherein the substrate comprises a first section and a second section, and wherein the phosphor layer is formed on the first section, and the third phosphor agent is formed on the second section.

12. The phosphor device according to claim 11, wherein the first phosphor agent is a yellow phosphor agent, the second phosphor agent is a red phosphor agent, and the third phosphor agent is a green phosphor agent of a yellow-green phosphor agent.

13. The phosphor device according to claim 11, wherein the substrate further comprises a third section, and the third section is a reflective section or a transparent section for directly reflecting the first waveband light or for the first waveband light to be transmitted through.

14. A phosphor device of an illumination system, the illumination system emitting a first waveband light, the phosphor device comprising:
a substrate; and
a phosphor layer formed on the substrate for converting the first waveband light into a second waveband light, comprising:
a first phosphor agent, wherein the first waveband light is converted into a first color light by the first phosphor agent, and the first color light has a first wavelength peak; and
a second phosphor agent distributed over the first phosphor agent and mixed with the first phosphor agent, wherein the first waveband light is converted into a second color light by the second phosphor agent, and the second color light has a second wavelength peak,
wherein the first color light and the second color light are integrated into the second waveband light, and the wavelength peak of the second waveband light is between the first wavelength peak and the second wavelength peak, and wherein the ratio of the weight of the first phosphor agent to the second phosphor agent is 2 to 15.

15. A phosphor device of an illumination system, the illumination system emitting a first waveband light, the phosphor device comprising:
a substrate; and
a phosphor layer formed on the substrate for converting the first waveband light into a second waveband light, comprising:
a first phosphor agent, wherein the first waveband light is converted into a first color light by the first phosphor agent, and the first color light has a first wavelength peak; and
a second phosphor agent distributed over the first phosphor agent and mixed with the first phosphor agent, wherein the first waveband light is converted into a second color light by the second phosphor agent, and the second color light has a second wavelength peak,
wherein the first color light and the second color light are integrated into the second waveband light, wherein the first wavelength peak is larger than or equal to 540 nanometers, and less than or equal to 570 nanometers, and wherein the second wavelength peak is larger than or equal to 600 nanometers, and less than or equal to 640 nanometers.

16. A phosphor device of an illumination system, the illumination system emitting a first waveband light, the phosphor device comprising:
a substrate; and
a phosphor layer formed on the substrate for converting the first waveband light into a second waveband light, comprising:
a first phosphor agent, wherein the first waveband light is converted into a first color light by the first phosphor agent; and
a second phosphor agent distributed over the first phosphor agent and mixed with the first phosphor agent, wherein the first waveband light is converted into a second color light by the second phosphor agent,
wherein the first color light and the second color light are integrated into the second waveband light, and the range of the spectrum of the first color light is at least partially overlapped with the range of the spectrum of the second color light, and wherein the full width at half maximum of the spectrum of the first color light is less than 120 nanometers, and the full width at half maximum of the spectrum of the second color light is less than 90 nanometers.

17. The phosphor device according to claim 16, wherein the first phosphor agent comprises Cerium, so that a first wavelength peak of the first color light is increased.

18. The phosphor device according to claim 16, wherein a second wavelength peak of the second color light is larger than or equal to 600 nanometers, and less than or equal to 640 nanometers.

19. A phosphor device of an illumination system, the illumination system emitting a first waveband light, the phosphor device comprising:
a substrate comprising a first section and a second section;
a phosphor layer formed on the first section for converting the first waveband light into a second waveband light, comprising:
a first phosphor agent, wherein the first waveband light is converted into a first color light by the first phosphor agent, and the first color light has a first wavelength peak; and a second phosphor agent distributed over the first phosphor agent and mixed with the first phosphor agent, wherein the first waveband light is converted into a second color light by the second phosphor agent, and the second color light has a second wavelength peak;

a reflective layer disposed between the first section of the substrate and the phosphor layer, wherein the reflective layer has a reflectance spectrum with a reflectivity corresponded to the second color light greater than the reflectivity corresponded to the second color light of aluminum; and a third phosphor agent formed on the second section, wherein the first waveband light is converted into a third waveband light by the third phosphor agent, wherein the first color light and the second color light are integrated into the second waveband light, and wherein the difference between the first wavelength peak and the second wavelength peak is larger than or equal to 50 nanometers, and less than or equal to 100 nanometers.

20. The phosphor device according to claim 19, wherein the reflective layer is a dielectric film layer.

21. A phosphor device of an illumination system, the illumination system emitting a first waveband light, the phosphor device comprising:

a substrate;

a phosphor layer formed on the substrate for converting the first waveband light into a second waveband light, comprising:

a first phosphor agent, wherein the first waveband light is converted into a first color light by the first phosphor agent, and the first color light has a first wavelength peak; and a second phosphor agent, wherein the first waveband light is converted into a second color light by the second phosphor agent, and the second color light has a second wavelength peak, wherein the second phosphor agent is distributed over the first phosphor layer with an average distribution or a gradient distribution, or the second phosphor agent is mixed with the first phosphor agent as a mixture, and wherein the weight percentage of the second phosphor agent is less than 85% relative to the first phosphor agent; and a reflective layer for reflecting at least the second waveband light, wherein the first color light and the second color light are integrated into the second waveband light, and the range of the spectrum of the first color light is at least partially overlapped with the range of the spectrum of the second color light, and wherein the difference between the first wavelength peak and the second wavelength peak is larger than or equal to 50 nanometers, and less than or equal to 100 nanometers.

22. The phosphor device according to claim 21, wherein the reflective layer is a diffuse reflective layer consisting of at least one of $SiO_2$, $TiO_2$, $Al_2O_3$, $ZrO_2$, ZnO, BN and white glue, and all of visible light is reflected by the diffuse reflective layer.

23. The phosphor device according to claim 21, wherein the reflective layer has a reflectance spectrum with a reflectivity corresponded to the second color light greater than the reflectivity corresponded to the second color light of aluminum.

24. The phosphor device according to claim 21, wherein the reflective layer is a dichroic layer, and a color light having the similar range of wavelength with the second waveband light is reflected by the dichroic layer.

* * * * *